Sept. 11, 1956     T. W. MOORE     2,762,678
ANTI-VIBRATION SUPPORT
Filed June 26, 1953     2 Sheets-Sheet 1
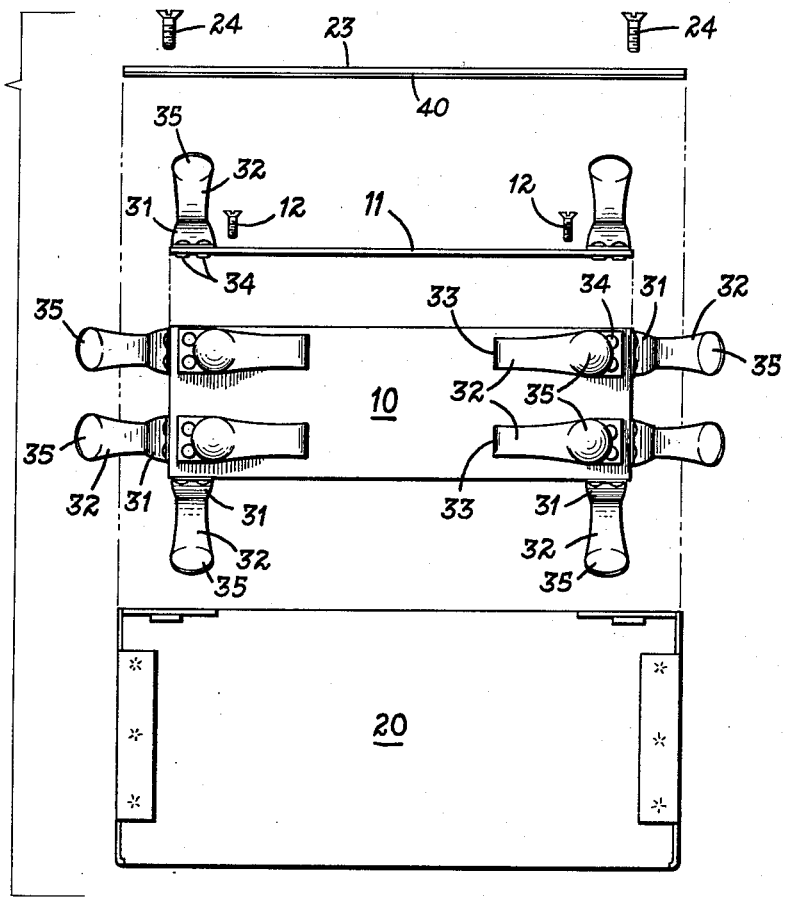
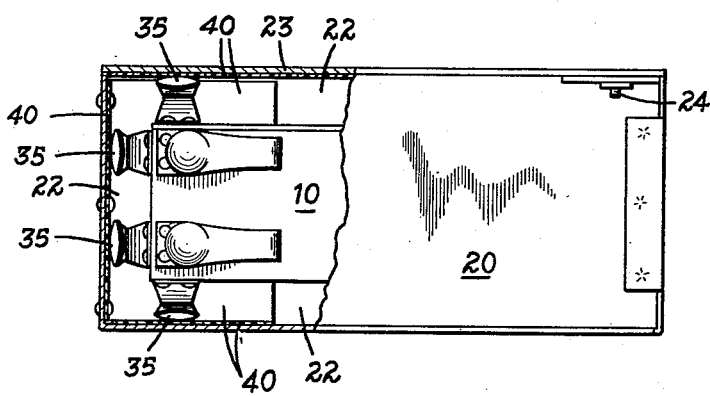
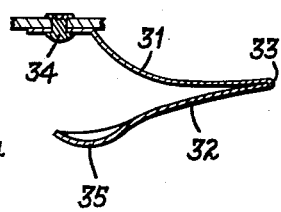
INVENTOR.
THOMAS W. MOORE
BY
Marechal Biebel French & Bugg
ATTORNEYS Sept. 11, 1956   T. W. MOORE   2,762,678
ANTI-VIBRATION SUPPORT
Filed June 26, 1953   2 Sheets—Sheet 2
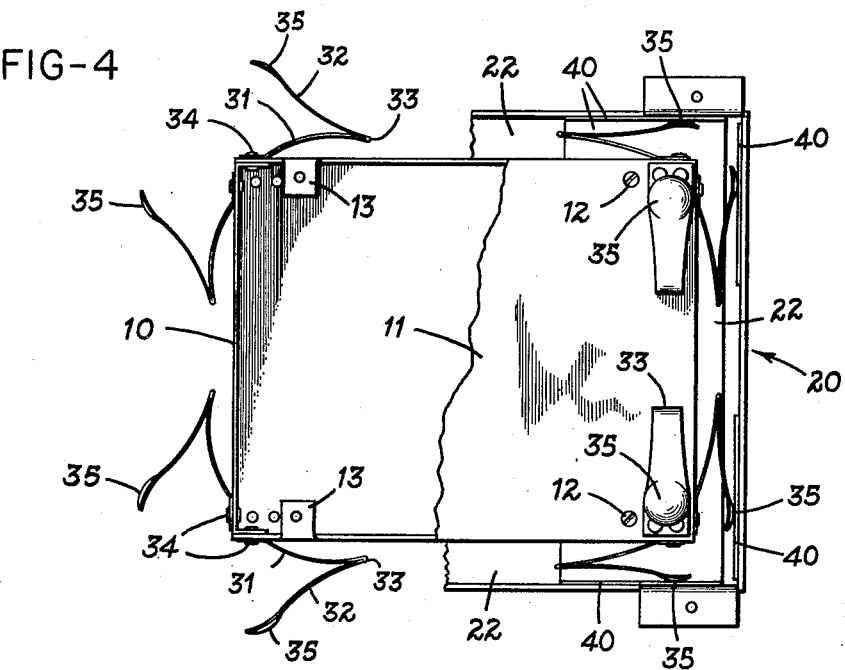
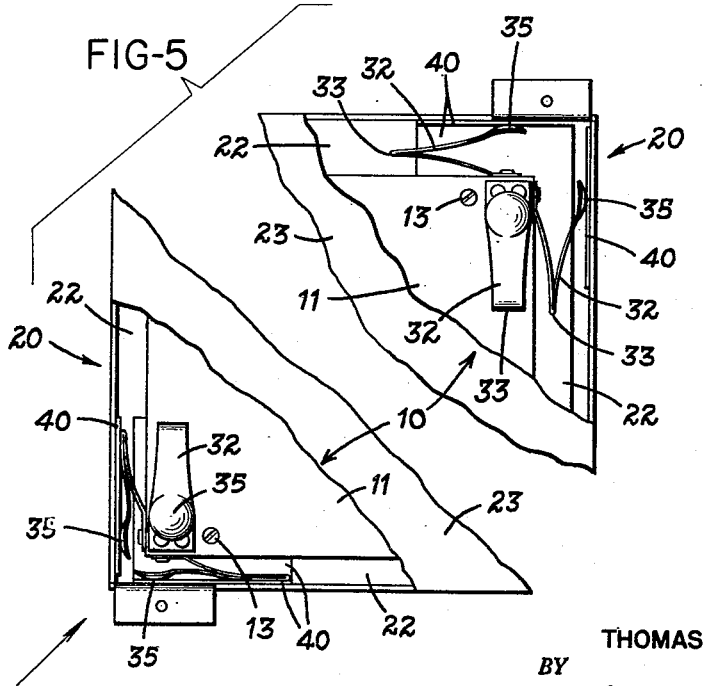
INVENTOR.
THOMAS W. MOORE
BY
Marechal Biebel French & Bugg
ATTORNEYS

United States Patent Office 2,762,678
Patented Sept. 11, 1956

---

2,762,678

ANTI-VIBRATION SUPPORT

Thomas W. Moore, Dayton, Ohio, assignor to American Machine & Foundry Company, New York, N. Y., a corporation of New Jersey Application June 26, 1953, Serial No. 364,435

7 Claims. (Cl. 312—352)

This invention relates to anti-vibration mountings for sensitive equipment and to such a mounting which protects the equipment against both intermittent mechanical shocks and continued vibration.

Electronic apparatus is an example of one type of sensitive equipment which it is necessary to protect against vibration and shock particularly inasmuch as the delicate parts of vacuum tubes, relays and other commponents thereof are subject to rapid deterioration or breakage where not properly protected. This may occur either from a severe blow or impact, or may develop under continued vibration particularly where the period of the vibration approaches a condition of resonance with an element of the equipment.

It is accordingly a principal object of the invention to provide an anti-vibration mounting which will protect sensitive equipment of various types in whatever position it may be in against the damaging effect of impact blows, rough handling, and vibration over a considerable range of frequencies and from whatever direction the disturbing force may be applied.

It is a further object to provide such a mounting which does not require blocking of the equipment during shipment, but which is a permanent part of the installation so that the sensitive elements are properly and adequately protected throughout their period of use.

It is a further object to provide an anti-vibration mounting constructed to dissipate vibrational energy of lower frequencies and relatively large amplitudes while attenuating continuous vibrations of higher frequencies and of smaller amplitudes.

It is still a further object to provide such a mounting which is simple and economical in construction, which will withstand a wide range of environmental conditions without deterioration, which has no aging effect, and which adequately protects the equipment throughout any ordinary shock or vibrating condition to which it may be subjected.

It is likewise an object to provide such a mounting in which the forces resisting displacement become progressively greater as the displacement increases thereby protecting the equipment against severe shocks as well as against vibrations of small amplitude.

Other objects and advantages will be apparent from the following description, the accompanying drawings, and the appending claims.

In the drawings—

Fig. 1 is an exploded view in elevation showing an anti-vibration mounting constructed in accordance with the present invention;

Fig. 2 is a view in side elevation with a portion of the wall of the supporting frame broken away showing the device in assembled condition;

Fig. 3 is a sectional view through one of the cantilever type spring arms forming part of the device;

Fig. 4 is a plan view looking down on the mounting; and

Fig. 5 is a broken view showing the conditions in response to a shock being applied to a corner of the supporting frame.

Referring to the drawings which disclose a preferred embodiment of the invention, the equipment to be protected is mounted within a chassis 10 which is shown as of generally rectangular shape having four side walls and a top and bottom wall. The top plate is shown at 11 and is fastened on the remainder of the chassis by means of screws 12 received in inturned lugs 13. No details of the equipment itself are shown since it forms no part of the invention and it is to be understood that it may comprise electronic or any other sensitive equipment which it is desired to protect. The equipment is fastened in fixed relation to the chassis by screws or in other suitable ways. The chassis may be apertured on one or more of its walls to allow ventilation, for access, and the like.

The chassis is arranged to be received within a box-like frame indicated generally at 20. The frame is of dimensions corresponding generally to those of the chassis but each side is longer, and the entire frame is somewhat larger than the chassis, as will clearly appear from Figs. 2 and 4. This provides spaces 22 at all sides of the chassis, including the top and bottom, so that the chassis is spaced from the frame on all faces. The frame has a removable top plate 23 secured in place by screws 24 and when the chassis has been assembled, the top plate of the frame is secured in place forming the complete assembly, the walls of the frame being similarly apertured as desired.

In order to support the chassis properly within the frame a number of cantilever type spring members are provided. Each of these spring members includes a flat leaf spring having portions 31 and 32 folded upon each other at fold line 33, thus forming essentially a V-shape spring construction. One open arm of the V is fixed to each face or wall of the chassis adjacent the corner thereof by suitable means such as rivets 34 while the other open arm of the V is formed with a spherical bearing surface 35 which extends outwardly from the wall of the chassis and occupies a position approximately opposite the point of attachment of the arm 31.

As shown in Fig. 4, there are at least two such spring members at each corner of the chassis, and as will appear from Fig. 2, there are preferably upper and lower sets of such spring members on each of the four side walls of the chassis. It will be understood that a greater or lesser number of the spring members may be used if desired depending upon the physical dimensions and the weight to be supported. In each case, however, the spring members are located adjacent the corners and hence at each corner there are three such spring members each occupying a plane at right angles to the other two.

The inside wall surfaces of the frame are lined with friction pads 40 in the areas where they will be contacted by the ball-shaped ends 35 of the spring arms. The material of these pads is selected to have a smooth surface with a low coefficient of friction, it having been found that such low coefficient of friction produces improved results and provides for proper dissipation of the energy produced by vibrations of higher amplitude. A suitable material for such friction pads comprises a phenolic base impregnated with a low friction material such as graphite or molybdenum disulphide, the coefficient of friction being about the same for static as for dynamic forces, such material also being adapted to withstand high temperatures.

It will be evident from analysis of Fig. 3 that as the spring arms bend in response to the chassis approaching any one of the adjacent surfaces of the frame, the one arm 31 will wrap the other 32 and thus reduce the effective moment arm of the spring. This results in a progressive increase in the force with which the spring resists displacement, with the result that the chassis is protected against actually striking the frame even under severe shock impacts, regardless of the position it occupies and of the direction of the disturbing force.

For small amplitudes and higher frequencies of vibration the ball-shaped ends 35 of the spring arms have little or no sliding action on the pads 40 of the frame and hence the vibration is attenuated and its effect reduced and not transmitted into the chassis. With vibrations of lower frequency and higher amplitude however there is a displacement of the chassis toward and away from the adjacent walls of the frame, resulting in dissipation of the energy as the ball-shaped ends of the springs ride in yielding friction engagement against the friction pads. Such sliding motion does not take place until the forces are sufficient to overcome the static coefficient of friction. The springs will yield by taking minor changes in shape for amplitudes less than that required to overcome static friction.

In Fig. 5 is shown a typical condition in which a severe shock force has been applied to the corner of the frame in the direction indicated by the arrow. The frame has moved toward the chassis but it will be noted that the spring arms on both opposite sides at the lower corner have wrapped upon each other and thus resist the displacement with a greatly increased force. As a result the chassis does not strike the corner of the frame but moves with it, the energy being dissipated under the action of the sliding frictional engagement between the friction pads and the spring arms. The same thing occurs in the third plane and thus the chassis is fully protected regardless of the direction of the impact force. It will also be noted from the condition of the spring arms in the upper right-hand corner of Fig. 5 that they remain in contact at all times with their respective friction pads and hence there is no tendency for the chassis to oscillate from one part of the frame to another. Likewise frictional energy is dissipated at all of the spring arm ends, not merely those subject to compression.

The initial period of vibration of the inner unit including its mass and components must be less than the minimum range of attenuated vibratory frequencies to which it may be subjected. For example, the present device may have a natural frequency in the general vicinity of 12 to 15 cycles and this will afford protection for vibration frequencies of about that range. A lower frequency produces an excessive initial sag in the mounted element due to gravitational forces, but by reason of the viscous damping resulting from the friction contact, vibration of lower frequencies, even within such range, will be substantially attenuated. It will be evident that such viscous damping tends to limit transmission of vibration energy from the frame to the spring such as might produce objectionable high frequency vibration in the spring itself if it were secured directly to the frame and had frictional bearing upon the chassis. It will also be seen that the present mounting may be advantageously employed when the vibrations are developed in the chassis and where it is desired to prevent transmission thereof or to reduce noise therefrom.

The present construction has been found to be highly satisfactory and to provide desirable protection for electronic and other sensitive equipment. It is especially advantageous in protecting such equipment not only during shipment but since it is a permanent part of the installation it remains effective at all times. Thus the equipment can be tested, regulated, and enclosed in its protective mounting, and even though it is thereafter subject to rough handling between the testing point and the point of final use, no additional blocking is required and it will arrive at its point of use in proper condition and without having been damaged in transit.

While the apparatus herein described constitutes a preferred embodiment of the invention, it is to be understood that the invention is not limited to this precise apparatus and changes may be made therein without departing from the scope of the invention which is defined in the appended claims.

What is claimed is:

1. An anti-vibration mounting for sensitive equipment and the like comprising a chassis on which said equipment is mounted, an enclosing box-like frame for receiving said chassis inwardly thereof, spring members on each of the faces of said chassis, said spring members including flat leaf springs each having two arm portions folded upon each other, one of said portions being secured to said chassis and the other arm portion having a free end in continuing yielding and frictional bearing engagement with the inner surface of said frame.

2. An anti-vibration mounting for sensitive equipment and the like comprising a chassis on which said equipment is mounted, an enclosing box-like frame for receiving said chassis inwardly thereof, spring members on each of the faces of said chassis, said spring members including flat leaf springs each having two arm portions folded upon each other, one of said portions being secured to said chassis adjacent each corner thereof and the other arm portion having a free end in yielding and frictional bearing engagement with the inner surface of said frame, and friction pads mounted on the inner surface of said frame in sliding energy-absorbing damping relation with the outer ends of said other arm portions.

3. An anti-vibration mounting for sensitive equipment and the like comprising a chassis on which said equipment is mounted, an enclosing box-like frame for receiving said chassis inwardly thereof, cantilever-type spring members on each of the faces of said chassis, said spring members including flat leaf springs each having two arm portions folded upon each other, one of said portions being secured to said chassis adjacent the corners thereof and the other arm portion having a ball-shaped end in free bearing engagement with each of the inner surfaces of said frame.

4. An anti-vibration mounting for sensitive equipment and the like comprising a chassis on which said equipment is mounted, an enclosing box-like frame for receiving said chassis inwardly thereof, spring members on each of the faces of said chassis, said spring members including flat leaf springs each having two arm portions folded upon each other, one of said arm portions being secured to said chassis and the other said arm portion having a free end in continuing bearing and frictional engagement with the opposed inner face of said frame, said arm portions wrapping each other as the displacement of said chassis toward the adjacent inner surface of said frame increases to provide progressively increasing resistance thereto.

5. An anti-vibration mounting for sensitive equipment and the like comprising a chassis on which said equipment is mounted, an enclosing box-like frame for receiving said chassis inwardly thereof, V-shaped spring means having one open arm of the V secured to the chassis adjacent the edge of each face thereof, the other open arm of said V having free yielding bearing engagement with each of the inner surfaces of said frame.

6. An anti-vibration mounting for preventing transmission of vibration and the like comprising a chassis, an enclosing box-like frame for receiving said chassis inwardly thereof, friction pads mounted on one of said members, leaf spring members on each face of said chassis having one end fastened to the other of said members with the other end of said spring member being free and projecting therefrom, said free ends of said spring members riding in continuous bearing engagement against said pads and adapted to yield for displacements of relatively small amplitude to attenuate the effect thereof on said chassis and to slide on said pads in response to larger displacements to damp the effect and dissipate the energy thereof.

7. An anti-vibration mounting for sensitive equipment and the like comprising a chassis on which that equipment is mounted, an enclosing box-like frame for receiving said chassis inwardly thereof and having faces corresponding to those of said chassis, flat springs mounted on each face of said chassis adjacent each corner thereof, folded arms on said springs having free ends in yieldable sliding bearing engagement with the inner surface of said frame at positions substantially opposite the points of attachment of said respective arms, said folded arms riding in frictional engagement toward the corners of said frame in response to displacement of said chassis thereby developing a progressively increasing resistance opposing such displacement.

References Cited in the file of this patent

UNITED STATES PATENTS

| | | |
|---|---|---|
| 746,848 | Klumpp | Dec. 15, 1903 |
| 1,024,431 | Banks | Apr. 23, 1912 |
| 1,331,677 | Schacter | Feb. 24, 1920 |
| 1,766,597 | Bushnell | June 24, 1930 |
| 2,397,804 | Nakken et al. | Apr. 2, 1946 |
| 2,439,530 | Tea | Apr. 13, 1948 |